(12) United States Patent
Huang et al.

(10) Patent No.: US 10,677,241 B2
(45) Date of Patent: Jun. 9, 2020

(54) AIR CONDITIONER, AND METHOD AND DEVICE FOR CONTROLLING ITS COMPRESSOR TO STOP

(71) Applicant: GD MIDEA AIR-CONDITIONING EQUIPMENT CO., LTD., Foshan (CN)

(72) Inventors: Zhaobin Huang, Foshan (CN); Guozhu Zhang, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 96 days.

(21) Appl. No.: 15/910,923

(22) Filed: Mar. 2, 2018

(65) Prior Publication Data

US 2018/0195508 A1    Jul. 12, 2018

Related U.S. Application Data

(63) Continuation of application No. PCT/CN2016/078284, filed on Apr. 1, 2016.

(30) Foreign Application Priority Data

Mar. 9, 2016   (CN) .......................... 2016 1 0134311

(51) Int. Cl.
*F04B 49/02* (2006.01)
*F04B 49/06* (2006.01)
(Continued)

(52) U.S. Cl.
CPC .............. *F04B 49/02* (2013.01); *F04B 49/06* (2013.01); *F04B 49/065* (2013.01); *F24F 11/00* (2013.01);
(Continued)

(58) Field of Classification Search
CPC .. F04B 49/02; F04B 9/06; F24F 11/30; H02P 5/50; H02P 5/56; H02P 6/24; H02P 6/28
See application file for complete search history.

(56) References Cited

U.S. PATENT DOCUMENTS

| 5,015,153 A | 5/1991 | Uesugi et al. |
| 2005/0091998 A1 | 5/2005 | Cho et al. |

(Continued)

FOREIGN PATENT DOCUMENTS

| CN | 1697954 A | * 11/2005 | ............ F25B 49/025 |
| CN | 1697954 A | 11/2005 | |

(Continued)

OTHER PUBLICATIONS

Watanabe, Air Conditioner, Mar. 15, 2004, Full Document (Year: 2004).*

(Continued)

*Primary Examiner* — Elizabeth J Martin
*Assistant Examiner* — Nael N Babaa
(74) *Attorney, Agent, or Firm* — Morgan, Lewis & Bockius LLP

(57) ABSTRACT

A method and a device for controlling a compressor to stop are disclosed in the present disclosure. The method includes: acquiring a rotor phase corresponding to a minimum load of the compressor; during a shutdown process of the air conditioner, acquiring a current orientation of the rotor of the compressor and determining whether a phase of the rotor is the rotor phase corresponding to the minimum load according to the current orientation of the rotor; and controlling the compressor to stop if determining that the phase of the rotor is the rotor phase corresponding to the minimum load. Therefore, a generated vibration and stress of a piping is smaller than that generated by directly stopping the compressor, to effectively reduce the vibration and stress of the (Continued)

a rotor phase corresponding to a minimum load of the compressor is acquired — S1 during a shutdown process of the air conditioner, a current orientation of the rotor of the compressor is acquired and it is determined whether the phase of the rotor is the rotor phase corresponding to the minimum load according to the current orientation of the rotor — S2 the compressor is controlled to stop if the phase of the rotor is the rotor phase corresponding to the minimum load — S3 piping at the moment that the compressor is stopped and to avoid a danger of breaking the piping.

9 Claims, 7 Drawing Sheets

(51) Int. Cl.
| | | |
|---|---|---|
| *F24F 11/00* | (2018.01) | |
| *H02P 5/56* | (2016.01) | |
| *H02P 5/50* | (2016.01) | |
| *H02P 6/24* | (2006.01) | |
| *F24F 11/30* | (2018.01) | |
| *F24F 11/70* | (2018.01) | |
| *F24F 140/50* | (2018.01) | |
| *F24F 140/12* | (2018.01) | |

(52) U.S. Cl.
CPC .............. *F24F 11/30* (2018.01); *F24F 11/70* (2018.01); *H02P 5/50* (2013.01); *H02P 5/56* (2016.02); *H02P 6/24* (2013.01); *F24F 2140/12* (2018.01); *F24F 2140/50* (2018.01)

(56) References Cited

U.S. PATENT DOCUMENTS

| | | |
|---|---|---|
| 2011/0194947 A1 | 8/2011 | Hong et al. |
| 2012/0269670 A1 | 10/2012 | Terazawa et al. |

FOREIGN PATENT DOCUMENTS

| | | | |
|---|---|---|---|
| CN | 102844571 A | 12/2012 | |
| CN | 105258301 A | 1/2016 | |
| EP | 2759788 A1 | 7/2014 | |
| JP | S6115589 A | 1/1986 | |
| JP | 2001037281 A | 2/2001 | |
| JP | 2001268967 A | 9/2001 | |
| WO | WO-2004083744 A1 * | 9/2004 | ............ F25B 49/025 |

OTHER PUBLICATIONS

GD Midea Air-Conditioning Equipment Co. Ltd., Extended European Search Report, EP16888598.6, dated Jan. 19, 2018, 8 pgs.
Midea Group Co. Ltd./Guangdong Midea Refrigeration Equipment Co. Ltd., First Office Action, CN201610134311.6, dated Feb. 13, 2017, 13 pgs.
Midea, International Search Report and Written Opinion, PCT/CN2016/078284, dated Dec. 21, 2016, 14 pgs.
GD Midea Air Conditioning Equipment Co. Ltd., Examination Report, IN201737026057, dated Oct. 16, 2019, 6 pgs.

* cited by examiner ically to a method for controlling a compressor in an air conditioner to stop, a device for controlling a compressor in an air conditioner to stop and an air conditioner having the device.

AIR CONDITIONER, AND METHOD AND DEVICE FOR CONTROLLING ITS COMPRESSOR TO STOP

PRIORITY CLAIM AND RELATED APPLICATION

This application is a continuation application of PCT/CN2016/078284, entitled "AIR CONDITIONER, AND METHOD AND DEVICE FOR CONTROLLING ITS COMPRESSOR TO STOP" filed on Apr. 1, 2016, which claims priority to Chinese Patent Application No. 201610134311.6, filed with the State Intellectual Property Office of the People's Republic of China on Mar. 9, 2016, entitled "AIR CONDITIONER, AND METHOD AND DEVICE FOR CONTROLLING ITS COMPRESSOR TO STOP", all of which are incorporated herein by reference in their entirety.

TECHNICAL FIELD

The present disclosure relates to the field of air conditioner technology, and more particularly to a method for controlling a compressor in an air conditioner to stop, a device for controlling a compressor in an air conditioner to stop and an air conditioner having the device.

BACKGROUND

In a related art of an inverter air conditioner, a refrigerant pressure and a load are heavier when the inverter air conditioner runs at a high frequency. If a compressor of the inverter air conditioner is stopped directly at the high frequency, energy of the refrigerant pressure and of the load may be released instantly such that a vibration and stress of a piping is too large and even there is a danger to break the piping. In the related art, it is generally to reduce the frequency to control the compressor to stop. That is, the frequency of the compressor is reduced to a low frequency and then the compressor is stopped. As a result, the vibration and stress of the piping is reduced at a moment that the compressor is stopped. However, the vibration and stress of the piping is still high at the moment that the compressor of the inverter air conditioner is stopped.

SUMMARY

Embodiments of the present disclosure provide a method for controlling a compressor in an air conditioner to stop. The method includes: acquiring a rotor phase corresponding to a minimum load of the compressor; during a shutdown process of the air conditioner, acquiring a current orientation of the rotor of the compressor and determining whether a phase of the rotor is the rotor phase corresponding to the minimum load according to the current orientation of the rotor; and controlling the compressor to stop if determining that the phase of the rotor is the rotor phase corresponding to the minimum load.

Embodiments of the present disclosure provide a device for controlling a compressor in an air conditioner to stop. The device includes: a processor; and a memory for storing instructions executable by the processor, in which the processor is configured to: acquire a rotor phase corresponding to a minimum load of the compressor; acquire a current orientation of the rotor of the compressor during a shutdown process of the air conditioner; and determine whether a phase of the rotor is the rotor phase corresponding to the minimum load according to the current orientation of the rotor, and control the compressor to stop if determining that the phase of rotor is the rotor phase corresponding to the minimum load.

Embodiments of the present disclosure provide an air conditioner. The air conditioner includes the above device for controlling a compressor in an air conditioner to stop.

DETAILED DESCRIPTION

Figure 1:
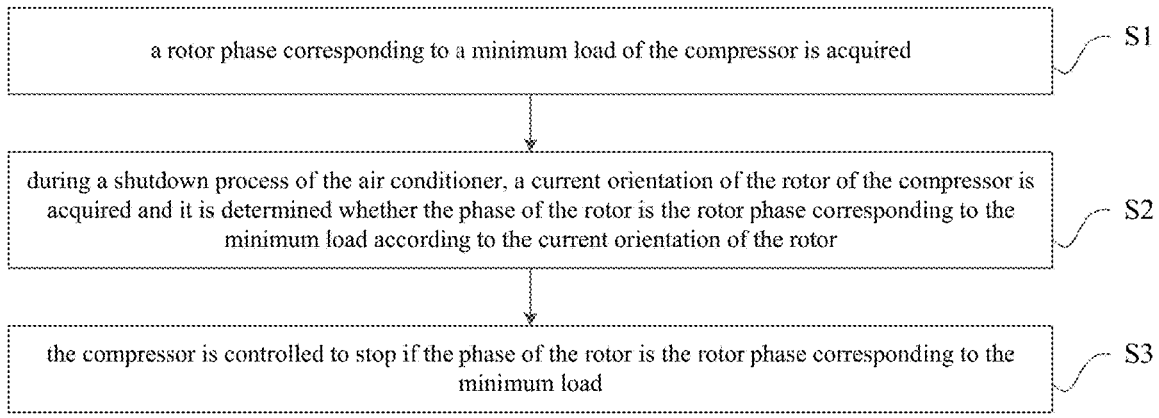
FIG. 1 is a flow chart illustrating a method for controlling a compressor in an air conditioner to stop according to an embodiment of the present disclosure.

Descriptions will be made in detail to embodiments of the present disclosure, examples of which are illustrated in drawings, in which the same or similar elements and the elements having same or similar functions are denoted by like reference numerals throughout the descriptions. The embodiments described herein with reference to drawings are explanatory, are intended to understand the present disclosure, and are not construed to limit the present disclosure.

The method for controlling a compressor in an air conditioner to stop, a device for controlling a compressor in an air conditioner to stop and an air conditioner having the device provided in embodiments of the present disclosure will be described referring to the drawings. In an embodiment of the present disclosure, the compressor is a compressor with a single rotor.

FIG. 1 is a flow chart illustrating a method for controlling a compressor in an air conditioner to stop according to an embodiment of the present disclosure. As illustrated in FIG. 1, the method includes following operations.

S1, a rotor phase corresponding to a minimum load of the compressor is acquired.

According to an embodiment of the present disclosure, the rotor phase corresponding to the minimum load corresponds to an orientation of the rotor when a suction and an exhaust are finished, that is, an orientation of the rotor when the compressor finishes exhausting within a mechanical cycle.

It should be noted that, within one refrigerant compression cycle of the compressor, the refrigerant with a low temperature and a low pressure enters into a suction pipe of the compressor. And then the refrigerant with the low temperature and the low pressure is gradually compressed into the refrigerant with a high temperature and a high pressure. The refrigerant with the high temperature and the high pressure is rapidly emitted to an evaporator through an exhaust port of the compressor. As a result, a load pressure of the compressor is minimal after the refrigerant is released. Therefore, the rotor phase corresponding to the minimum load of the compressor is a phase of the rotor of the compressor after the refrigerant is emitted (i.e. when the compressor finishes exhausting).

According to an embodiment of the present disclosure, the rotor phase corresponding to the minimum load is acquired according to a difference between the rotor phase corresponding to the minimum load and a mechanical zero-phase of the rotor, and according to an identification of the mechanical zero-phase. Alternatively, according to an embodiment of the present disclosure, the rotor phase corresponding to the minimum load is acquired according to a minimum amplitude of a torque current of the compressor or by acquiring a minimum amplitude of a compensation torque of the compressor.

It is to be understood that, when the compressor runs at a phase near the rotor phase corresponding to the minimum load, the corresponding amplitude of the torque current of the compressor will also be relatively small. Therefore, in a case that a rotation speed is controlled smooth and steady, if the amplitude of the torque current is minimal, then it may be considered that the orientation of the rotor of the compressor corresponds to the rotor phase corresponding to the minimum load.

During a process that the air conditioner runs at a low frequency, the compressor is controlled with a torque compensation using a torque compensation technique to reduce a vibration of a piping during the compressor is running. Within one refrigerant compression cycle, the amplitude of a compensation torque varies periodically with a refrigerant pressure and a load. When the refrigerant pressure and the load are minimal, the corresponding amplitude of the compensation torque is minimal. Then, it may be considered that the orientation of the rotor of the compressor corresponds to the rotor phase corresponding to the minimum load.

As described above, the rotor phase corresponding to the minimum load of the compressor may be obtained directly by calibrating designed orientations of the rotor of the compressor. Or the rotor phase corresponding to the minimum load of the compressor may be obtained indirectly according to variables, such as, the amplitude of the torque current of the compressor or the amplitude of the compensation torque of the compressor. For a direct method of calibrating the rotor phase, as a phase difference between the rotor phase corresponding to the minimum load and the mechanical zero-phase of the rotor is known, the rotor phase corresponding to the minimum load of the compressor may be obtained by identifying the mechanical zero-phase of the rotor of the compressor. For an indirect method of acquiring the rotor phase, as a phase corresponding to a minimum amplitude of the torque current or corresponding to a minimum amplitude of the compensation torque is the rotor phase corresponding to the minimum load of the compressor, the rotor phase corresponding to the minimum load of the compressor may be obtained by acquiring the minimum amplitude of the torque current or the minimum amplitude of the compensation torque.

S2, during a shutdown process of the air conditioner, a current orientation of the rotor of the compressor is acquired and it is determined whether the phase of the rotor is the rotor phase corresponding to the minimum load according to the current orientation of the rotor.

According to an embodiment of the present disclosure, the current orientation of the rotor of the compressor may be acquired by two methods. One of the two methods is from a direct measurement via sensors; another of the two methods is from a calculation of a current of the compressor by measuring the current of the compressor.

S3, the compressor is controlled to stop when the phase of the rotor is the rotor phase corresponding to the minimum load.

Further, according to an embodiment of the present disclosure, the compressor is controlled to continue to run if it is determined that the phase of the rotor is not the rotor phase corresponding to the minimum load of the compressor.

In other words, the compressor is stopped when the phase of the rotor is the rotor phase corresponding to the minimum load of the compressor. It should be noted that, within a refrigerant compression cycle of the compressor (particularly a compressor with a single rotor), the refrigerant pressure and the load vary periodically, when the phase of the rotor is near the rotor phase corresponding to the minimum load of the compressor, the refrigerant pressure is relatively small accordingly. Therefore, if the compressor is stopped when the phase of the rotor of the compressor is the rotor phase corresponding to the minimum phase of the compressor, the vibration and stress of the piping is smaller.

Specifically, after a stop signal for stopping the compressor is output from a controlling module of the air conditioner, the controlling module begins to control the compressor to stop. During the shutdown process of the air conditioner (i.e. during the shutdown process of the compressor), the current orientation of the rotor of the compressor is acquired. If the phase of the rotor of the compressor is the rotor phase corresponding to the minimum load, the compressor is controlled to stop immediately. Otherwise, if the phase of the rotor of the compressor is not the rotor phase corresponding to the minimum load of the compressor, the compressor is controlled to continue to run until the phase of the rotor of the compressor is the rotor phase corresponding to the minimum load of the compressor, and the compressor is controlled to stop when the phase of the rotor of the compressor is the rotor phase corresponding to the minimum load of the compressor.

Thus, with the method according to embodiments of the present disclosure, during the shutdown process of the present disclosure, the current orientation of the rotor of the compressor is acquired, and the compressor is controlled to stop if the phase of the rotor is the rotor phase corresponding to the minimum load of the compressor. As a result, a generated vibration and stress of a piping is smaller than that generated by directly stopping the compressor, to effectively reduce the vibration and stress of the piping at the moment that the compressor is stopped and to avoid a danger of breaking the piping.

Figure 2:
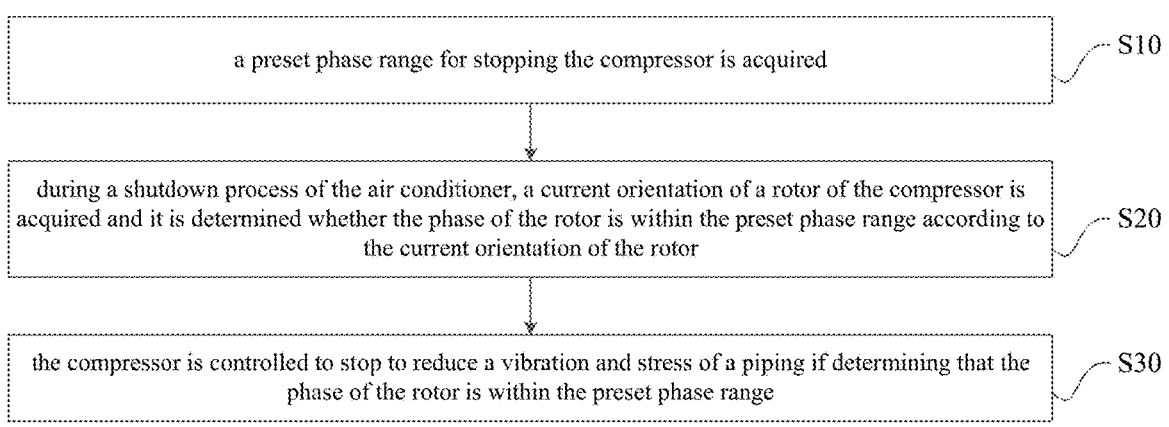
FIG. 2 is a flow chart illustrating a method for controlling a compressor in an air conditioner to stop according to another embodiment of the present disclosure.

FIG. 2 is a flow chart illustrating a method for controlling a compressor in an air conditioner to stop according to another embodiment of the present disclosure. As illustrated in FIG. 2, the method includes following operations.

S10, a preset phase range for stopping the compressor is acquired.

According to an embodiment of the present disclosure, the present phase range is obtained according to an experimental test and is stored to the air condition to be invoked. Furthermore, according to an embodiment of the present disclosure, the preset phase range may be pre-determined according to a rotor phase corresponding to a minimum load of the compressor.

Figure 4:
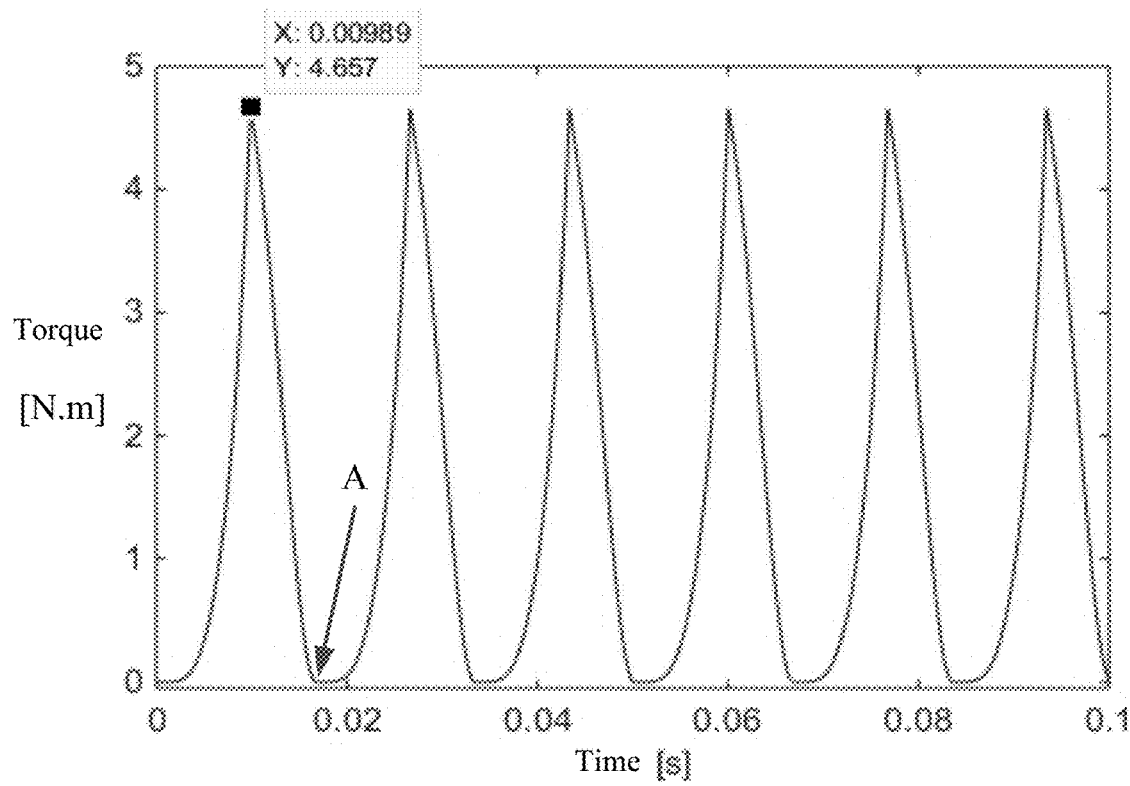
FIG. 4 is a schematic diagram illustrating a load characteristic curve of a compressor when running at a frequency of 60 Hz.

Specifically, the experimental test is performed on the compressor of the air conditioner to determine the rotor phase corresponding to the minimum load of the compressor. And then, the rotor phase corresponding to the minimum load of the compressor floats upward by a first preset threshold and downward by a second preset threshold to define the preset phase range for stopping the compressor. The preset phase range for stopping the compressor may also be considered as the preset phase range in which the load of the compressor is relatively small. For example, as illustrated in FIG. 4, it is assumed that the load of the compressor at a point A is minimal, the rotor phase at the point A may be acquired as the rotor phase P corresponding to the minimum load of the compressor. Then, the rotor phase P corresponding to the minimum load of the compressor floats upward by the threshold L1 and the rotor phase P corresponding to the minimum load of the compressor floats downward by the threshold L2, to determine the preset phase range for stopping the compressor as [P−L2, P+L1].

According to a specific example of the present disclosure, the preset phase range for stopping the compressor may be [170°, 190°]. In an embodiment of the present disclosure, the preset phase range for stopping the compressor may be [175°, 185°].

More specifically, according to an embodiment of the present disclosure, the rotor phase corresponding to the minimum load of the compressor corresponds to an orientation of the rotor when suction and exhaust are finished, that is, an orientation of the rotor when the compressor finishes exhausting within a mechanical cycle.

It should be noted that, within one refrigerant compression cycle of the compressor, the refrigerant with a low temperature and a low pressure enters into a suction pipe of the compressor. And then the refrigerant is gradually compressed into the refrigerant with a high temperature and a high pressure. The refrigerant with the high temperature and the high pressure is rapidly emitted to an evaporator through an exhaust port of the compressor. As a result, a load pressure of the compressor is minimal after the refrigerant is released. Therefore, the rotor phase corresponding to the minimum load of the compressor is a phase of the rotor of the compressor after the refrigerant is emitted (i.e. when the compressor finishes exhausting).

More specifically, according to an embodiment of the present disclosure, the rotor phase corresponding to the minimum load may be acquired according to a difference between the rotor phase corresponding to the minimum load and a mechanical zero-phase of the rotor, and according to an identification of the mechanical zero-phase. Alternatively, according to an embodiment of the present disclosure, the rotor phase corresponding to the minimum load may be acquired according to a minimum amplitude of a torque current of the compressor or by acquiring a minimum amplitude of a compensation torque of the compressor.

It is to be understood that, when the compressor runs at a phase near the rotor phase corresponding to the minimum load, the corresponding amplitude of the torque current of the compressor will also be relatively small. Therefore, in a case that a rotation speed is controlled smooth and steady, if the amplitude of the torque current is minimal, then it may be considered that the orientation of the rotor of the compressor corresponds to the rotor phase corresponding to the minimum load.

During a process that the air conditioner runs at a low frequency, the compressor is controlled with a torque compensation using a torque compensation technique to reduce a vibration of a piping during the compressor is running. Within one refrigerant compression cycle, the amplitude of a compensation torque varies periodically with a refrigerant pressure and a load. When the refrigerant pressure and the load are minimal, the corresponding amplitude of the compensation torque is minimal. Then, it may be considered that the orientation of the rotor of the compressor corresponds to the rotor phase corresponding to the minimum load.

As described above, the rotor phase corresponding to the minimum load of the compressor may be obtained directly by calibrating designed orientations of the rotor of the compressor. Or the rotor phase corresponding to the minimum load of the compressor may be obtained indirectly according to variables, such as, the amplitude of the torque current of the compressor or the amplitude of the compensation torque of the compressor. For a direct method of calibrating the rotor phase, as a phase difference between the rotor phase corresponding to the minimum load and the mechanical zero-phase of the rotor is known, the rotor phase corresponding to the minimum load of the compressor may be obtained by identifying the mechanical zero-phase of the rotor of the compressor. For an indirect method of acquiring the rotor phase, as a phase corresponding to a minimum amplitude of the torque current or corresponding to a minimum amplitude of the compensation torque is the rotor phase corresponding to the minimum load of the compressor, the rotor phase corresponding to the minimum load of the compressor may be obtained by acquiring the minimum amplitude of the torque current or the minimum amplitude of the compensation torque.

S20, during a shutdown process of the air conditioner, a current orientation of a rotor of the compressor is acquired and it is determined whether the phase of the rotor is within the preset phase range according to the current orientation of the rotor.

According to an embodiment of the present disclosure, the current orientation of the rotor of the compressor may be acquired by two methods. One of the two methods is by a direct measurement via sensors; another of the two methods is according to a calculation of a current of the compressor by measuring the current of the compressor.

S30, the compressor is controlled to stop to reduce a vibration and stress of a piping if determining that the phase of the rotor is within the preset phase range.

Further, according to an embodiment of the present disclosure, the compressor is controlled to continue to run if it is determined that the phase of the rotor is not within the preset phase range for stopping the compressor.

In other words, the compressor is stopped only if the phase of the rotor is within the preset phase range for stopping the compressor. It should be noted that, within a refrigerant compression cycle of the compressor (particularly a compressor with a single rotor), the refrigerant pressure and the load vary periodically. When the phase of the rotor is near the rotor phase corresponding to the minimum load of the compressor, the refrigerant pressure is relatively small accordingly. Therefore, the preset phase range for stopping the compressor is determined by floating the rotor phase corresponding to the minimum load of the compressor upwardly and downwardly. And the compressor is stopped when the phase of the rotor of the compressor is within the preset phase range for stopping the compressor. As a result, the vibration and stress of the piping is smaller than that generated by directly stopping the compressor.

Specifically, after a stop signal for stopping the compressor is output from a controlling module of the air conditioner, the controlling module begins to control the compressor to stop. During the shutdown process of the air conditioner (i.e. during the shutdown process of the compressor), the current orientation of the rotor of the compressor is acquired in real time. If the phase of the rotor of the compressor is within the preset phase range for stopping the compressor, the compressor is controlled to stop immediately. Otherwise, if the phase of the rotor of the compressor is not within the preset phase range for stopping the compressor, the compressor is controlled to continue to run, until the phase of the rotor of the compressor is within the preset phase range for stopping the compressor, and the compressor is controlled to stop when the phase of the rotor of the compressor is within the preset phase range for stopping the compressor.

Thus, with the method according to embodiments of the present disclosure, during the shutdown process of the present disclosure, the current orientation of the rotor of the compressor is acquired, and the compressor is controlled to stop if the phase of the rotor is within the preset phase range for stopping the compressor. As a result, a generated vibration and stress of a piping is smaller than that generated by directly stopping the compressor, to effectively reduce the vibration and stress of the piping at the moment that the compressor is stopped and to avoid a danger of breaking the piping.

Figure 3:
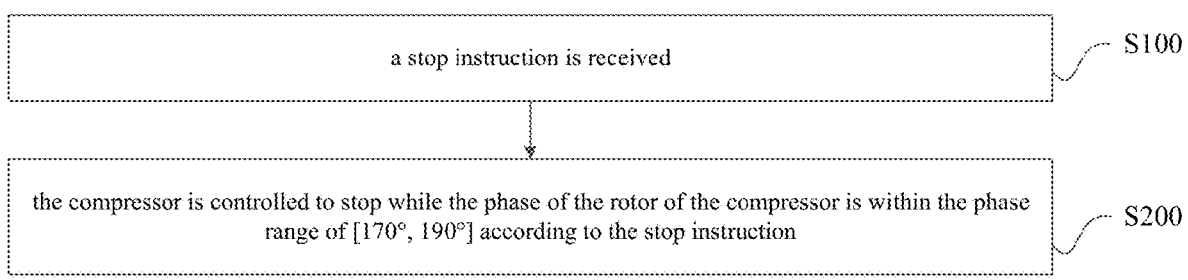
FIG. 3 is a flow chart illustrating a method for controlling a compressor in an air conditioner to stop according to a still another embodiment of the present disclosure.

FIG. 3 is a flow chart illustrating a method for controlling a compressor in an air conditioner to stop according to a still another embodiment of the present disclosure. As illustrated in FIG. 3, the method includes followings.

S100, a stop instruction is received.

S200, the compressor is controlled to stop while the phase of the rotor of the compressor is within the phase range of [170°, 190°] according to the stop instruction.

With the method according to embodiments of the present disclosure, after the stop instruction is received, the compressor is controlled to stop while the phase of the rotor of the compressor is within the phase range of [170°, 190°] according to the stop instruction. As a result, a generated vibration and stress of a piping is smaller than that generated by directly stopping the compressor, to effectively reduce the vibration and stress of the piping at the moment that the compressor is stopped and to avoid a danger of breaking the piping.

A validity of the method for controlling a compressor in an air conditioner according to the above embodiments of the present disclosure is verified with experimental results with combination of FIGS. 3 to 14.

Taking a compressor of a type of ASK103 as an example, the compressor is controlled to run at the frequency of 60 Hz, a load characteristic curve of the compressor when the compressor is running at the frequency of 60 Hz is illustrated in FIG. 4.

When the controlling module outputs the stop signal for stopping the compressor, if the phase of the rotor of the compressor is within the preset phase range for stopping the compressor, the compressor is stopped immediately. Otherwise, the compressor continues to run until the rotor of the compressor is within the preset phase range for stopping the compressor, and then the compressor is stopped when the rotor of the compressor is within the preset phase range for stopping the compressor.

Specifically, in the embodiment, the rotor phase of the compressor corresponding to the minimum load of the compressor is 180°, and the preset phase range for stopping the compressor is 175-185°. When the controlling module outputs the stop signal for stopping the compressor and the phase of the rotor is within 175-185°, the compressor is stopped immediately. Otherwise, the compressor continues to run until the phase of the rotor of a next mechanical cycle is within 175-185°, and the compressor is stopped when the phase of the rotor is within the 175-185°.

Figure 5:
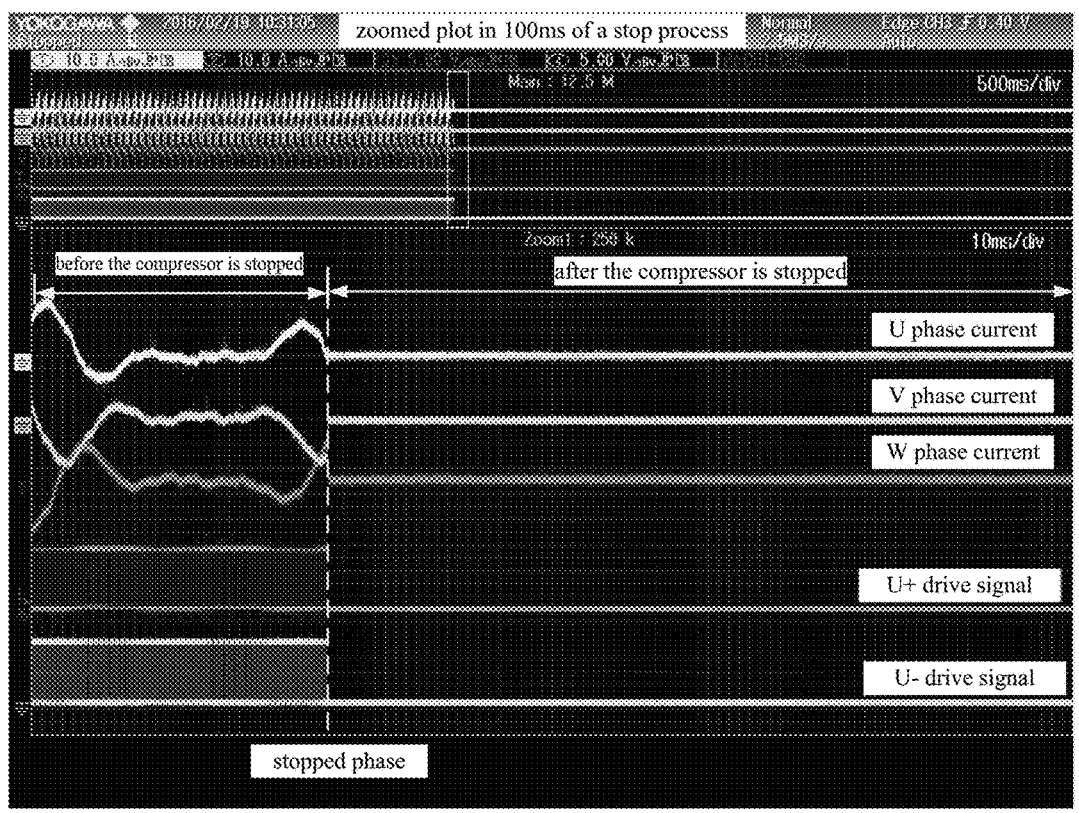
FIG. 5 is a waveform plot of a phase current vs. a U phase drive signal of a compressor during a first shutdown process in a related art.
Figure 6:
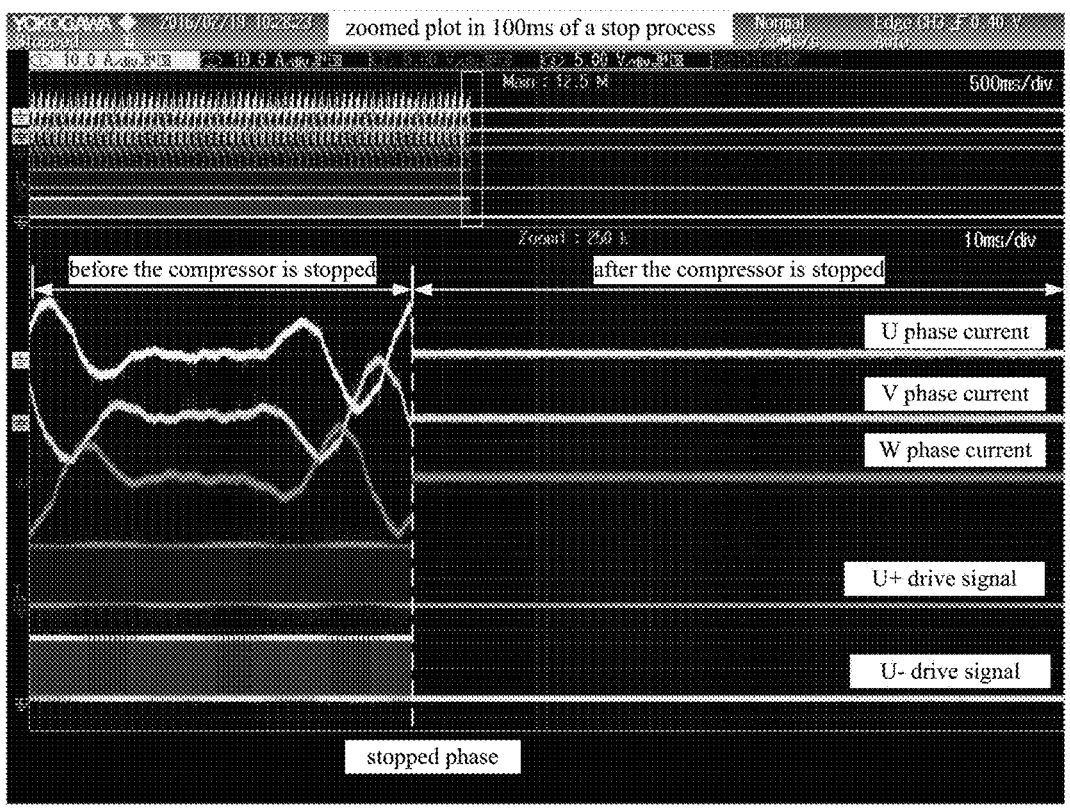
FIG. 6 is a waveform plot of a phase current vs. a U phase drive signal of a compressor during a second shutdown process in a related art.
Figure 7:
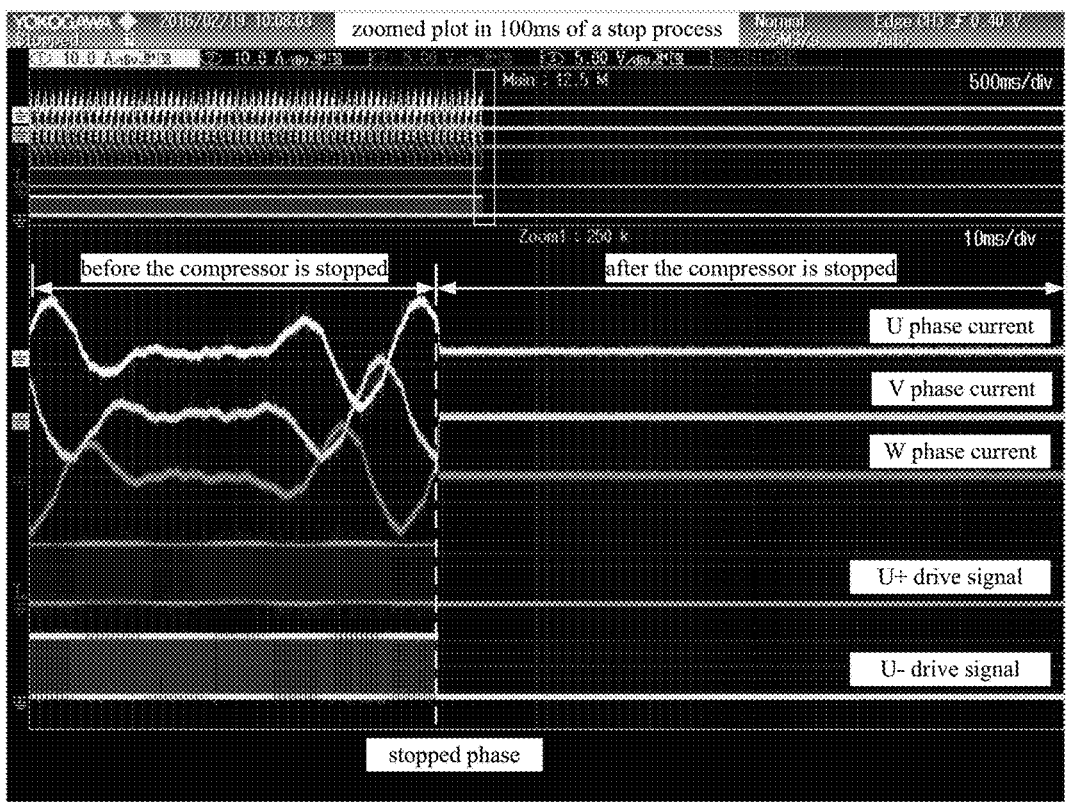
FIG. 7 is a waveform plot of a phase current vs. a U phase drive signal of a compressor during a third shutdown process in a related art.
Figure 8:
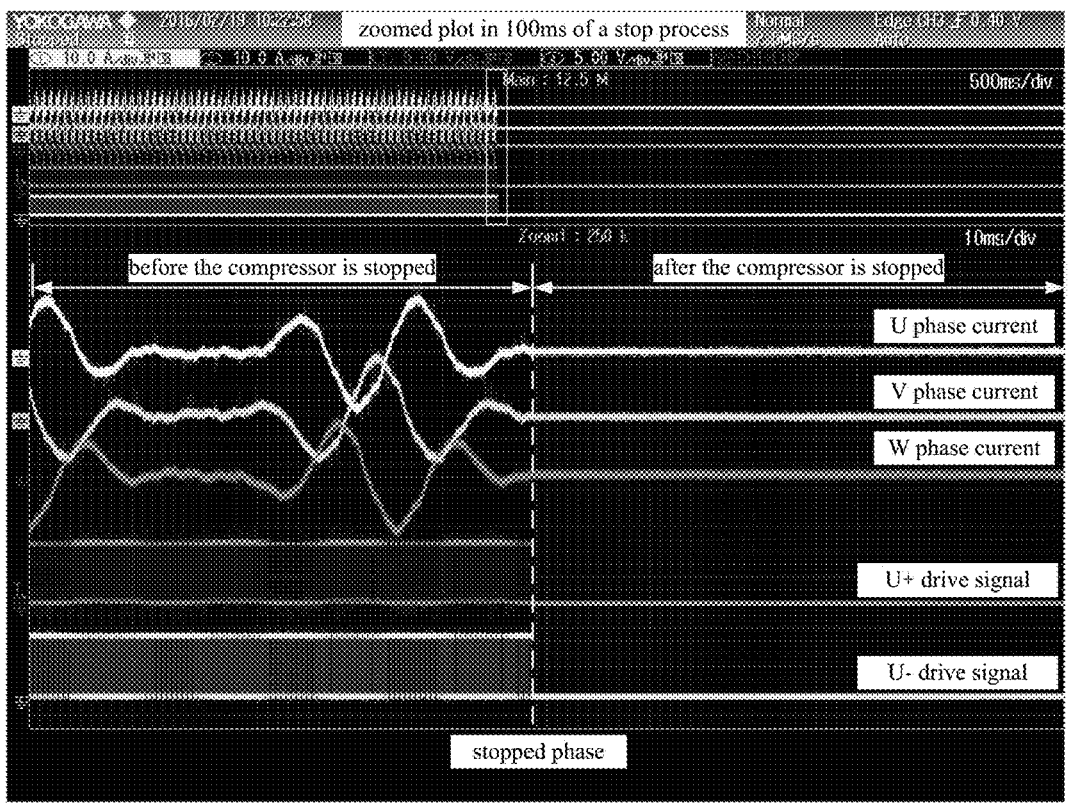
FIG. 8 is a waveform plot of a phase current vs. a U phase drive signal of a compressor during a fourth shutdown process in a related art.
Figure 9:
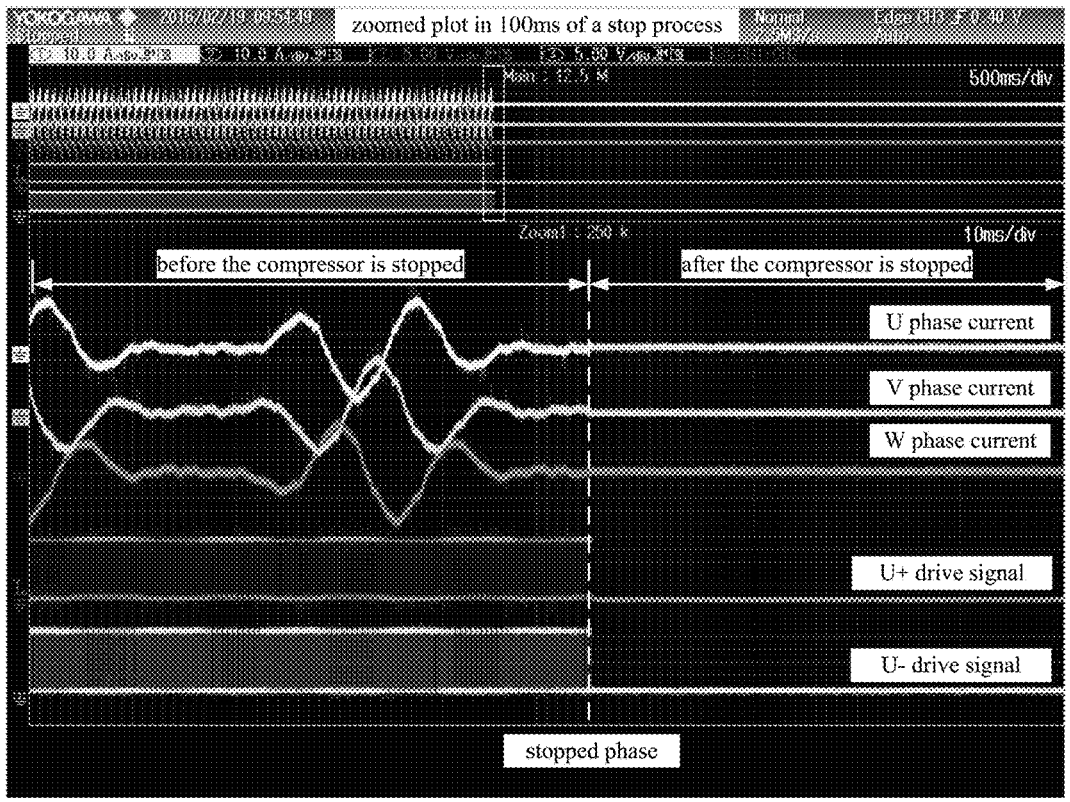
FIG. 9 is a waveform plot of a phase current vs. a U phase drive signal of a compressor during a fifth shutdown process in a related art.
Figure 10:
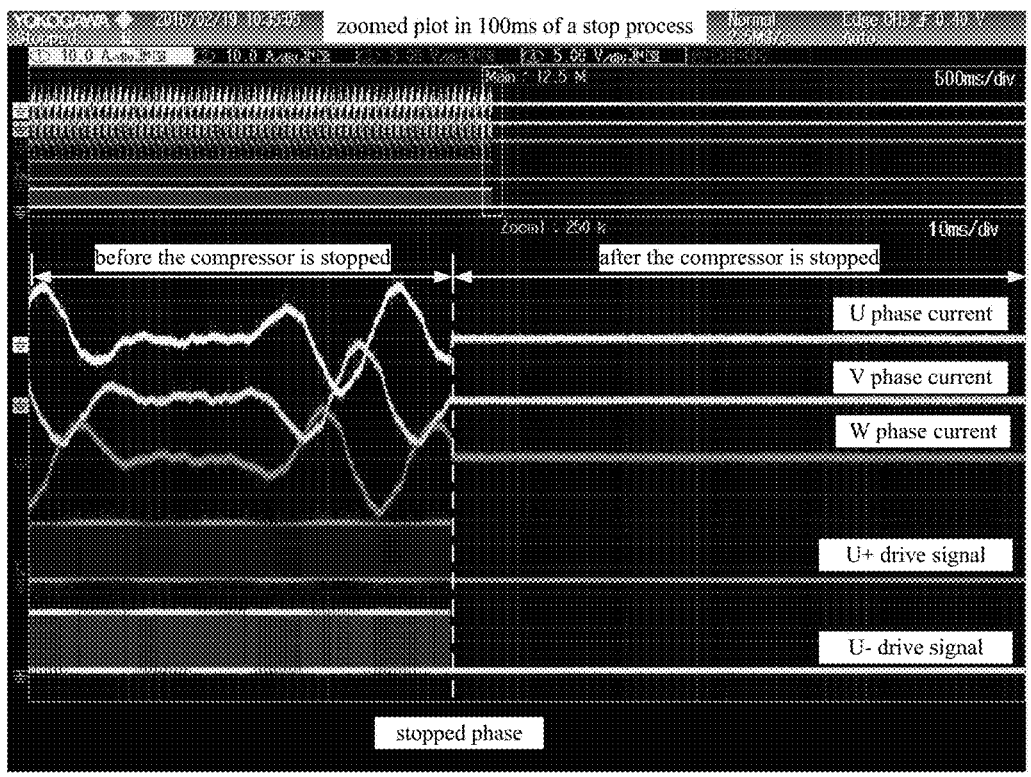
FIG. 10 is a waveform plot of a phase current vs. a U phase drive signal of a compressor during a first shutdown process according to a first specific embodiment of the present disclosure.
Figure 11:
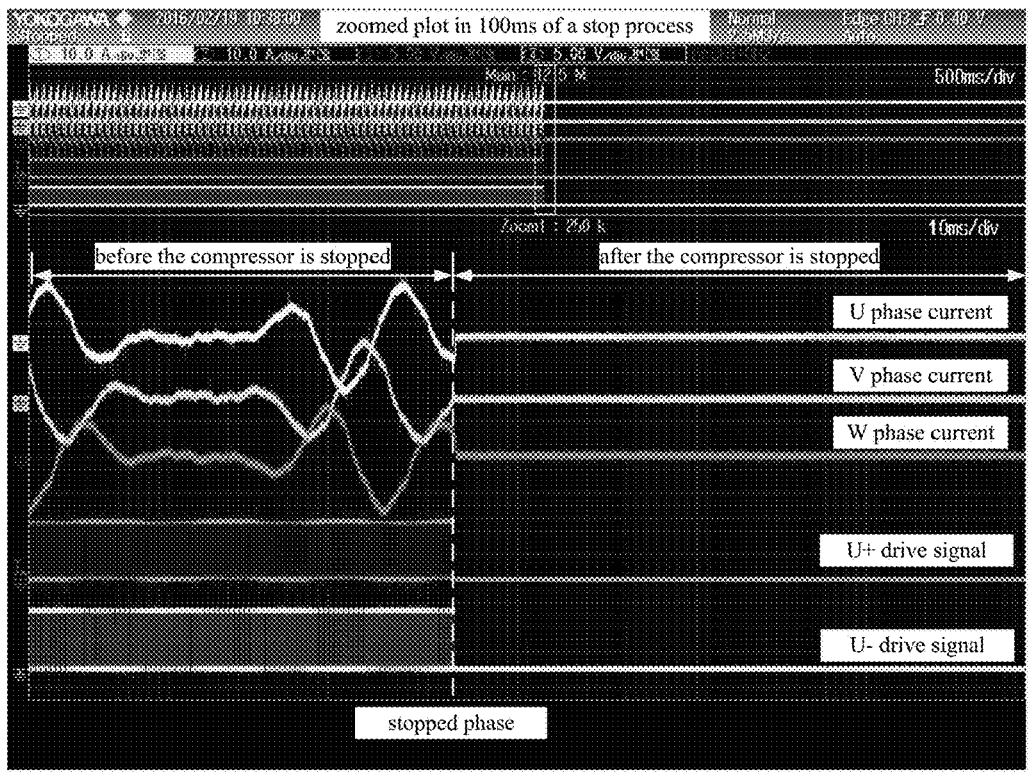
FIG. 11 is a waveform plot of a phase current vs. a U phase drive signal of a compressor during a first shutdown process according to a second specific embodiment of the present disclosure.
Figure 12:
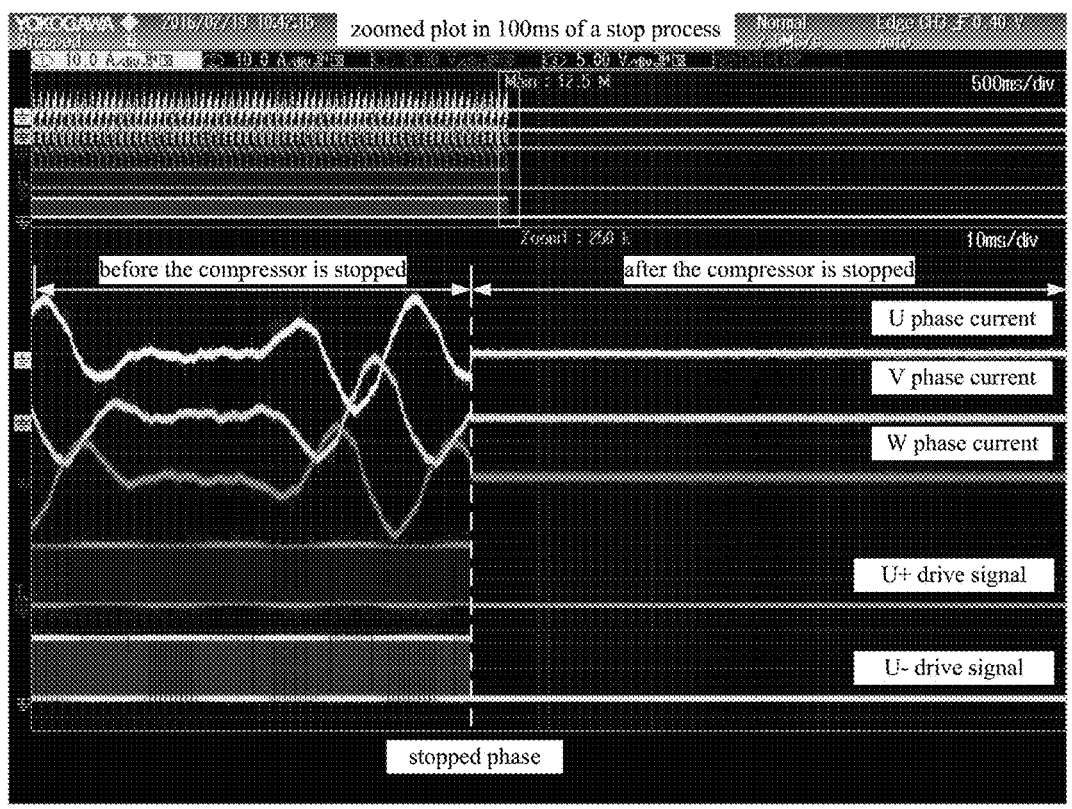
FIG. 12 is a waveform plot of a phase current vs. a U phase drive signal of a compressor during a first shutdown process according to a third specific embodiment of the present disclosure.
Figure 13:
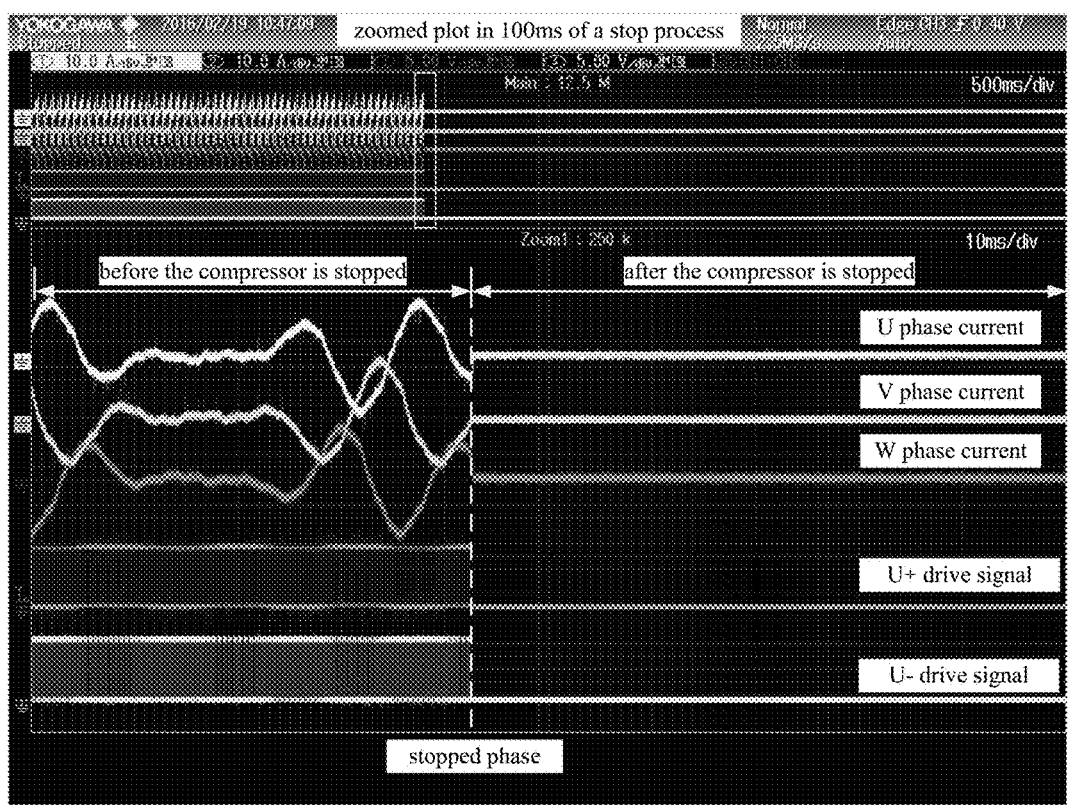
FIG. 13 is a waveform plot of a phase current vs. a U phase drive signal of a compressor during a first shutdown process according to a fourth specific embodiment of the present disclosure.

FIGS. 5-9 are waveform plots of phase currents vs. U phase drive signals of a compressor during a 100 ms shutdown process in the related art. CH1, CH2 and MATH are a U phase current, a V phase current and a W phase current (10 A/div) of the compressor respectively, CH3 and CH4 are a drive signal at an upper bridge leg of the U phase (U+) and a drive signal at a lower bridge leg of the U phase (U−) respectively. The moment that the drive signal at the U phase is stopped is the moment that the compressor is stopped. As illustrated in FIGS. 5-7, at the moment that the compressor is stopped, the stop phases of three phase current are not fixed.

FIGS. 10-13 are waveform plots of phase currents vs. U phase drive signals of the compressor during a 100 ms shutdown process according to a specific example of the present disclosure. CH1, CH2 and MATH are the U phase current, the V phase current and the W phase current (10 A/div) of the compressor respectively, CH3 and CH4 are the drive signal at the upper bridge leg of the U phase (U+) and the drive signal at the lower bridge leg of the U phase (U−) respectively. The moment that the drive signal at the U phase is stopped is the moment that the compressor is stopped. As illustrated in FIGS. 8-11, at the moment that the compressor is stopped, the stop phases of three phase current are essentially fixed.

Thus, by controlling the compressor to stop when the phase of the rotor is within the preset phase range for stopping the compressor, the vibration and stress of the piping is minimal.

Figure 14:
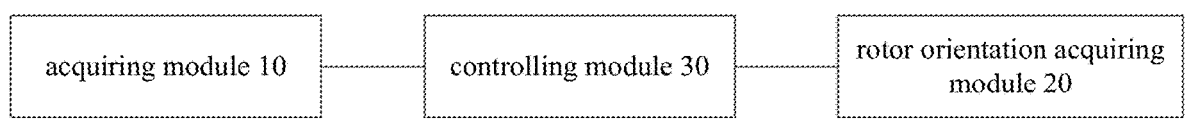
FIG. 14 is a block diagram of a device for controlling a compressor in an air conditioner to stop according to an embodiment of the present disclosure.

FIG. 14 is a block diagram of a device for controlling a compressor in an air conditioner to stop according to an embodiment of the present disclosure. As illustrated in FIG.

14, the device includes: an acquiring module 10, a rotor orientation acquiring module 20 and a controlling module 30.

The acquiring module 10 is configured to acquire a rotor phase corresponding to a minimum load of the compressor. The rotor orientation acquiring module 20 is configured to acquire a current orientation of the rotor of the compressor during a shutdown process of the air conditioner. The controlling module 30 is configured to determine whether a phase of the rotor is the rotor phase corresponding to the minimum load according to the current orientation of the rotor, and to control the compressor to stop if determining that the phase of rotor is the rotor phase corresponding to the minimum load.

Further, according to an embodiment of the present disclosure, the controlling module 30 is configured to control the compressor to continue to run if it is determined that the phase of the rotor of the compressor is not the rotor phase corresponding to the minimum load of the compressor.

In other words, the controlling module 30 controls the compressor to stop only if the phase of the rotor is the rotor phase corresponding to the minimum load of the compressor. It should be noted that, within a refrigerant compression cycle of the compressor (particularly a compressor with a single rotor), the refrigerant pressure and the load vary periodically, when the phase of the rotor is near the rotor phase corresponding to the minimum load of the compressor, the refrigerant pressure is relatively small accordingly. Therefore, the compressor is stopped when the phase of the rotor of the compressor is the rotor phase corresponding to the minimum phase of the compressor. As a result, the vibration and stress of the piping is smaller than that generated by directly stopping the compressor.

Specifically, after a stop signal for stopping the compressor is output from the controlling module 30 to the compressor, the controlling module 30 begins to control the compressor to stop. During the shutdown process of the air conditioner (i.e. during the shutdown process of the compressor), the rotor orientation acquiring module 20 may acquire the current orientation of the rotor of the compressor. If the phase of the rotor of the compressor is the rotor phase corresponding to the minimum load, the controlling module 30 controls the compressor to stop immediately. Otherwise, if the phase of the rotor of the compressor is not the rotor phase corresponding to the minimum load of the compressor, the controlling module 30 controls the compressor to continue to run until the phase of the rotor of the compressor is the rotor phase corresponding to the minimum load of the compressor, and the controlling module 30 controls the compressor to stop when the phase of the rotor of the compressor is the rotor phase corresponding to the minimum load of the compressor.

According to an embodiment of the present disclosure, the rotor phase corresponding to the minimum load corresponds to an orientation of the rotor when a suction and an exhaust are finished, that is, an orientation of the rotor when the compressor finishes exhausting within a mechanical cycle.

It should be noted that, within one refrigerant compression cycle of the compressor, the refrigerant with a low temperature and a low pressure enters into a suction pipe of the compressor. And then the refrigerant with the low temperature and the low pressure is gradually compressed into the refrigerant with a high temperature and a high pressure. The refrigerant with the high temperature and the high pressure is rapidly emitted to an evaporator through an exhaust port of the compressor. As a result, a load pressure of the compressor is minimal after the refrigerant is released. Therefore, the rotor phase corresponding to the minimum load of the compressor is a phase of the rotor of the compressor after the refrigerant is emitted (i.e. when the compressor finishes exhausting). With the phase of the rotor of the compressor when the exhausting is finished, the compressor is controlled to stop such that the vibration and stress of the piping is relatively small at the moment when the compressor is stopped.

According to an embodiment of the present disclosure, the acquiring module 10 may acquire the rotor phase corresponding to the minimum load of the compressor according to a difference between the rotor phase corresponding to the minimum load and a mechanical zero-phase of the rotor, and according to an identification of the mechanical zero-phase. Alternatively, according to an embodiment of the present disclosure, the acquiring module 10 may acquire the rotor phase corresponding to the minimum load of the compressor according to a minimum amplitude of a torque current of the compressor or by acquiring a minimum amplitude of a compensation torque of the compressor.

It is to be understood that, when the compressor runs at a phase near the rotor phase corresponding to the minimum load, the corresponding amplitude of the torque current of the compressor will also be relatively small. Therefore, in a case that a rotation speed is controlled smooth and steady, if the amplitude of the torque current is minimal, then it may be considered that the orientation of the rotor of the compressor corresponds to the rotor phase corresponding to the minimum load.

During a process that the air conditioner runs at a low frequency, the compressor is controlled with a torque compensation using a torque compensation technique to reduce a vibration of a piping during the compressor is running. Within one refrigerant compression cycle, the amplitude of a compensation torque varies periodically with a refrigerant pressure and a load. When the refrigerant pressure and the load are minimal, the corresponding amplitude of the compensation torque is minimal. Then, it may be considered that the orientation of the rotor of the compressor corresponds to the rotor phase corresponding to the minimum load.

As described above, the rotor phase corresponding to the minimum load of the compressor may be obtained directly by calibrating designed orientations of the rotor of the compressor. Or the rotor phase corresponding to the minimum load of the compressor may be obtained indirectly according to variables, such as, the amplitude of the torque current of the compressor or the amplitude of the compensation torque of the compressor. For a direct method of calibrating the rotor phase, as a phase difference between the rotor phase corresponding to the minimum load and the mechanical zero-phase of the rotor is known, the acquiring module 10 may acquire the rotor phase corresponding to the minimum load of the compressor by identifying the mechanical zero-phase of the rotor of the compressor. For an indirect method of acquiring the rotor phase, as a phase corresponding to a minimum amplitude of the torque current or corresponding to a minimum amplitude of the compensation torque is the rotor phase corresponding to the minimum load of the compressor, the acquiring module 10 may acquire the rotor phase corresponding to the minimum load of the compressor by acquiring the minimum amplitude of the torque current or the minimum amplitude of the compensation torque.

According to an embodiment of the present disclosure, the rotor orientation acquiring module 20 may acquire the current orientation of the rotor of the compressor by two methods. One of the two methods is by a direct measurement via sensors; another of the two methods is according to a calculation of a current of the compressor by measuring the current of the compressor.

In conclusion, with the device according to embodiments of the present disclosure, during the shutdown process of the air conditioner, by acquiring the current orientation of the rotor of the compressor via the rotor orientation acquiring module, the controlling module controls the compressor to stop if the phase of the rotor is within the preset phase range. As a result, a generated vibration and stress of the piping is smaller than that generated by directly stopping the compressor, to effectively reduce the vibration and stress of the piping at the moment that the compressor is stopped and to avoid a danger of breaking the piping.

Embodiments of the present disclosure further provide an air conditioner. The air conditioner includes the above device for controlling a compressor in an air conditioner to stop.

With the air conditioner according to embodiments of the present disclosure, via the above device for controlling a compressor in an air conditioner to stop, the vibration and stress of the piping may be reduced at the moment that the compressor is stopped and to avoid a danger of breaking the piping.

Figure 15:
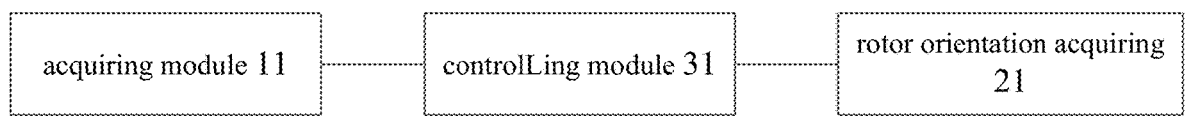
FIG. 15 is a block diagram of a device for controlling a compressor in an air conditioner to stop according to another embodiment of the present disclosure.

FIG. 15 is a block diagram of a device for controlling a compressor in an air conditioner to stop according to another embodiment of the present disclosure. As illustrated in FIG. 15, the device includes: an acquiring module 11, a rotor orientation acquiring module 21 and a controlling module 31.

The acquiring module 11 is configured to acquire a preset phase range for stopping the compressor. The rotor orientation acquiring module 21 is configured to acquire a current orientation of a rotor of the compressor during a shutdown process of the air conditioner. The controlling module 31 is configured to determine whether a phase of the rotor is within the preset phase range according to the current orientation of the rotor, and to control the compressor to stop to reduce a vibration and stress of a piping if determining that the phase of the rotor is within the preset phase range.

Further, according to an embodiment of the present disclosure, the controlling module 31 is configured to control the compressor to continue to run if the phase of the rotor of the compressor is not within the preset phase range for stopping the compressor.

In other words, the controlling module 31 controls the compressor to stop only if the phase of the rotor is within the preset phase range for stopping the compressor. It should be noted that, within a refrigerant compression cycle of the compressor (particularly a compressor with a single rotor), the refrigerant pressure and the load vary periodically. When the phase of the rotor is near the rotor phase corresponding to the minimum load of the compressor, the refrigerant pressure is relatively small accordingly. Therefore, the preset phase range for stopping the compressor is determined by floating the rotor phase corresponding to the minimum load of the compressor upwardly and downwardly. And the compressor is stopped when the phase of the rotor of the compressor is within the preset phase range for stopping the compressor. As a result, the vibration and stress of the piping is smaller than that generated by directly stopping the compressor.

Specifically, after a stop signal for stopping the compressor is output from the controlling module 31 to the compressor, the controlling module 31 begins to control the compressor to stop. During the shutdown process of the air conditioner (i.e. during the shutdown process of the compressor), the rotor orientation acquiring module 21 may acquire the current orientation of the rotor of the compressor. If the phase of the rotor of the compressor is within the preset phase range for stopping the compressor, the controlling module 31 controls the compressor to stop immediately. Otherwise, if the phase of the rotor of the compressor is not within the preset phase range for stopping the compressor, the controlling module 31 controls the compressor to continue to run, until the phase of the rotor of the compressor is within the preset phase range for stopping the compressor, and the compressor is controlled to stop when the phase of the rotor of the compressor is within the preset phase range for stopping the compressor.

According to an embodiment of the present disclosure, the present phase range is obtained according to an experimental test and is stored to the air condition to be invoked.

Specifically, the experimental test is performed on the compressor of the air conditioner to determine the rotor phase corresponding to the minimum load of the compressor. And then, the rotor phase corresponding to the minimum load of the compressor floats upward by a first preset threshold and downward by a second preset threshold as the preset phase range for stopping the compressor. The preset phase range for stopping the compressor may also be considered as the preset phase range in which the load of the compressor is relatively small. For example, as illustrated in FIG. 4, it is assumed that the load of the compressor at a point A is minimal, the rotor phase at the point A may be acquired as the rotor phase P corresponding to the minimum load of the compressor. Then, the rotor phase P corresponding to the minimum load of the compressor floats upward by the threshold L1 and the rotor phase P corresponding to the minimum load of the compressor floats downward by the threshold L2, to determine the preset phase range for stopping the compressor as [P−L2, P+L1].

According to a specific example of the present disclosure, the preset phase range for stopping the compressor may be [170°, 190°], further preferably may be [175°, 185°].

More specifically, according to an embodiment of the present disclosure, the rotor phase corresponding to the minimum load of the compressor corresponds to an orientation of the rotor when suction and exhaust are finished, that is, an orientation of the rotor when the compressor finishes exhausting within a mechanical cycle.

It should be noted that, within one refrigerant compression cycle of the compressor, the refrigerant with a low temperature and a low pressure enters into a suction pipe of the compressor. And then the refrigerant is gradually compressed into the refrigerant with a high temperature and a high pressure. The refrigerant with a high temperature and a high pressure is rapidly emitted to an evaporator through an exhaust port of the compressor. As a result, a load pressure of the compressor is minimal after the refrigerant is released. Therefore, the rotor phase corresponding to the minimum load of the compressor is a phase of the rotor of the compressor after the refrigerant is emitted (i.e. when the compressor finishes exhausting).

More specifically, according to an embodiment of the present disclosure, the rotor phase corresponding to the minimum load may be acquired according to a difference between the rotor phase corresponding to the minimum load and a mechanical zero-phase of the rotor, and according to an identification of the mechanical zero-phase. Alternatively, according to an embodiment of the present disclosure, the rotor phase corresponding to the minimum load may be acquired according to a minimum amplitude of a torque current of the compressor or by acquiring a minimum amplitude of a compensation torque of the compressor.

It is to be understood that, when the compressor runs at a phase near the rotor phase corresponding to the minimum load, the corresponding amplitude of the torque current of the compressor will also be relatively small. Therefore, in a case that a rotation speed is controlled smooth and steady, if the amplitude of the torque current is minimal, then it may be considered that the orientation of the rotor of the compressor corresponds to the rotor phase corresponding to the minimum load.

During a process that the air conditioner runs at a low frequency, the compressor is controlled with a torque compensation using a torque compensation technique to reduce a vibration of a piping during the compressor is running. Within one refrigerant compression cycle, the amplitude of a compensation torque varies periodically with a refrigerant pressure and a load. When the refrigerant pressure and the load are minimal, the corresponding amplitude of the compensation torque is minimal. Then, it may be considered that the orientation of the rotor of the compressor corresponds to the rotor phase corresponding to the minimum load.

As described above, the rotor phase corresponding to the minimum load of the compressor may be obtained directly by calibrating designed orientations of the rotor of the compressor. Or the rotor phase corresponding to the minimum load of the compressor may be obtained indirectly according to variables, such as, the amplitude of the torque current of the compressor or the amplitude of the compensation torque of the compressor. For a direct method of calibrating the rotor phase, as a phase difference between the rotor phase corresponding to the minimum load and the mechanical zero-phase of the rotor is known, the rotor phase corresponding to the minimum load of the compressor may be obtained by identifying the mechanical zero-phase of the rotor of the compressor. For an indirect method of acquiring the rotor phase, as a phase corresponding to a minimum amplitude of the torque current or corresponding to a minimum amplitude of the compensation torque is the rotor phase corresponding to the minimum load of the compressor, the rotor phase corresponding to the minimum load of the compressor may be obtained by acquiring the minimum amplitude of the torque current or the minimum amplitude of the compensation torque.

In conclusion, with the device according to embodiments of the present disclosure, during the shutdown process of the air conditioner, by acquiring the current orientation of the rotor of the compressor via the rotor orientation acquiring module, the controlling module controls the compressor to stop if the phase of the rotor is within the preset phase range. As a result, a generated vibration and stress of the piping is smaller than that generated by directly stopping the compressor, to effectively reduce the vibration and stress of the piping at the moment that the compressor is stopped and to avoid a danger of breaking the piping.

Embodiments of the present disclosure further provide an air conditioner. The air conditioner includes the above device for controlling a compressor in an air conditioner to stop.

With the air conditioner according to embodiments of the present disclosure, via the above device for controlling a compressor in an air conditioner to stop, the vibration and stress of the piping may be reduced at the moment that the compressor is stopped and to avoid a danger of breaking the piping.

Figure 16:
FIG. 16 is a block diagram of a device for controlling a compressor in an air conditioner to stop according to a still another embodiment of the present disclosure.

FIG. 16 is a block diagram of a device for controlling a compressor in an air conditioner to stop according to a still another embodiment of the present disclosure. As illustrated in FIG. 16, the device includes a receiving module 12 and a controlling module 32.

The receiving module 12 is configured to receive a stop instruction. The controlling module 32 is configured to control the compressor to stop while the phase of the rotor of the compressor is within the phase range of [170°, 190°] according to the stop instruction.

With the method according to embodiments of the present disclosure, after the stop instruction is received, the compressor is controlled to stop while the phase of the rotor of the compressor is within the phase range of [170°, 190°] according to the stop instruction. As a result, a generated vibration and stress of a piping is smaller than that generated by directly stopping the compressor, to effectively reduce the vibration and stress of the piping at the moment that the compressor is stopped and to avoid a danger of breaking the piping.

Embodiments of the present disclosure further provide an air conditioner. The air conditioner includes the above device for controlling a compressor in an air conditioner to stop.

With the air conditioner according to embodiments of the present disclosure, via the above device for controlling a compressor in an air conditioner to stop, the vibration and stress of the piping may be reduced at the moment that the compressor is stopped and to avoid a danger of breaking the piping.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations illustrated in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

In the present disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been illustrated and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for controlling a compressor in an air conditioner to stop, comprising:
    during a shutdown process of the air conditioner, acquiring a current orientation of a rotor of the compressor;
    determining a rotor phase corresponding to a minimum load of the compressor in accordance with the current orientation of the rotor of the compressor and a minimum amplitude of a torque current of the compressor or a minimum amplitude of a compensation torque of the compressor;
    determining whether a phase of the rotor is within a preset phase range for stopping the compressor, wherein the preset phase range is determined by floating the rotor phase corresponding to the minimum load upwardly and downwardly; and
    controlling the compressor to stop if determining that the phase of the rotor is within the preset phase range.

2. The method according to claim 1, wherein the rotor phase corresponding to the minimum load corresponds to an orientation of the rotor when the compressor finishes exhausting within a mechanical cycle.

3. The method according to claim 1, wherein the preset phase range is obtained according to an experimental test and is stored to the air condition to be invoked.

4. The method according to claim 1, wherein the preset phase range is pre-determined according to a rotor phase corresponding to a minimum load of the compressor.

5. A device for controlling a compressor in an air conditioner to stop, comprising:
    a processor; and
    a memory for storing instructions executable by the processor,
    wherein the processor is configured to:
        acquire a current orientation of a rotor of the compressor during a shutdown process of the air conditioner;
        determine a rotor phase corresponding to a minimum load of the compressor in accordance with the current orientation of the rotor of the compressor and a minimum amplitude of a torque current of the compressor or a minimum amplitude of a compensation torque of the compressor;
        determine whether a phase of the rotor is within a preset phase for stopping the compressor, wherein the preset phase range is determined by floating the rotor phase corresponding to the minimum load upwardly and downwardly, and control the compressor to stop if determining that the phase of the rotor is within the preset phase range.

6. The device according to claim 5, wherein the rotor phase corresponding to the minimum load corresponds to an orientation of the rotor when the compressor finishes exhausting within a mechanical cycle.

7. The device according to claim 5, wherein the preset phase range is obtained according to an experimental test and is stored to the air condition to be invoked.

8. The device according to claim 5, wherein the preset phase range is pre-determined according to a rotor phase corresponding to a minimum load of the compressor.

9. An air conditioner, comprising a device for controlling a compressor in an air conditioner to stop, wherein the device comprises:
    a processor; and
    a memory for storing instructions executable by the processor,
    wherein the processor is configured to:
    acquire a current orientation of a rotor of the compressor during a shutdown process of the air conditioner;
    determine a rotor phase corresponding to a minimum load of the compressor in accordance with the current orientation of the rotor of the compressor and a minimum amplitude of a torque current of the compressor or a minimum amplitude of a compensation torque of the compressor;
    determine whether a phase of the rotor is within a preset phase range for stopping the compressor, wherein the preset phase range is determined by floating the rotor phase corresponding to the minimum load upwardly and downwardly, and control the compressor to stop if determining that the phase of the rotor is within the preset range.

* * * * *